(No Model.)
G. BAUSCH.
EYE GLASS AND SPECTACLES COMBINED.
No. 260,928. Patented July 11, 1882.
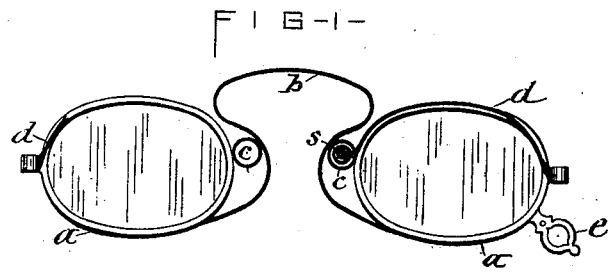
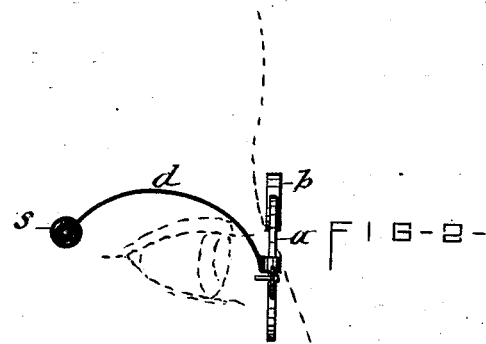
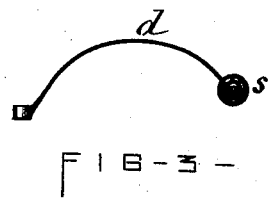
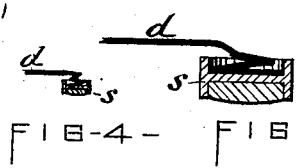
Witnesses=
Inventor=
George T Bausch
per Duell, Laass & Hey
his Attys

UNITED STATES PATENT OFFICE.

GEORGE BAUSCH, OF SYRACUSE, NEW YORK.

EYEGLASS AND SPECTACLES COMBINED.

SPECIFICATION forming part of Letters Patent No. 260,928, dated July 11, 1882.

Application filed March 2, 1882. (No model.)

*To all whom it may concern:*

Be it known that I, GEORGE BAUSCH, of Syracuse, in the county of Onondaga, in the State of New York, have invented new and useful Improvements in Eyeglass and Spectacles Combined, of which the following, taken in connection with the accompanying drawings, is a full, clear, and exact description.

The nature of this invention consists in the combination, with spring-connected lenses or eyeglasses, of two supporting-arms flexibly connected to the outer portion thereof and adapted to fold over onto the eyeglasses and curved to correspond to the outline of the edges thereof and to pass around them when the glasses are folded, thereby allowing the device to be used either in the form of ordinary eyeglasses or as spectacles, as may be desired, all as hereinafter more fully explained, and specifically set forth in the claims.

In the annexed drawings, Figure 1 is a face view of my invention arranged for use as eyeglasses, a portion of one of the hinged arms being broken away to better show the construction of the eyeglass-frame. Fig. 2 is a side view, showing its adaptation for wear as spectacles. Fig. 3 is a detached view of one of the supporting-arms. Fig. 4 is a sectional view of the spring-pad which is connected to the free end of the supporting-arms of the spectacles, and Fig. 5 is the same enlarged to better illustrate its construction.

Similar letters of reference indicate corresponding parts.

$a\ a$ represent the two bows or frames in which the lenses are set, and $b$ the spring by which said frames are flexibly connected, the whole, in conjunction with the usual handle, $e$, forming ordinary eyeglasses, adapted to be clamped on the nose of the wearer.

To the outer portion of the respective lens-frames $a\ a$, I hinge an arm, $d$, by means of a knuckle-joint, which allows them to fold inward in the manner similar to the supporting-arms of spectacles. These arms $d$, however, I curve so that when folded inward upon the eyeglass-frame they will clear or leave unobstructed the lenses or main portion thereof, and thus avoid interference with the use of the device in the form of ordinary eyeglasses. The free end of the arm $d$ is terminated at an aperture or open ring, $c$, interposed between the inner portion of the lens-frame $a$ and the adjacent portion of the spring $b$, as shown in Fig. 1 of the drawings. Said two arms $d\ d$ are thus made short and without intermediate joints, and when required for use and distended, as shown in Fig. 2 of the drawings, they bear with their free end against the temples of the wearer, and by their hold thereon retain the eyeglasses in position, the distention of the arms $d\ d$ spreading the spring $b$, so as to deprive it of its hold on the nose of the wearer, and at the same time bringing the longer diameters of the two lenses in line with each other, and thus in a better position for the eyes.

In order to render the device more comfortable to the wearer thereof, I connect to the free end of the supporting-arms $d$ a spring-pad, $s$, in the form of a circular case, in one side of which is secured a pad of cork, rubber, or other suitable material. The opposite side of said case is connected to the free end of the arm $d$ by means of a spring, which may be either integral with said arm or consist of a separate spring connected to the arm in any suitable manner. The described spring-pad is secured to the arm $d$ in such a position as to bring the pad to bear on the temple of the wearer of the spectacles and afford the requisite hold thereon. The spring-connection of said pad with the elastic arm $d$ prevents excessive pressure on the temples. The case of the spring-pad is of such dimensions as to allow it to enter the aperture $c$ when the arm $d$ is folded inward upon the eyeglass-frame, as shown in Fig. 1 of the drawings, and when in that position the device can be used as ordinary eyeglasses.

Having described my invention, what I claim is—

1. The combination, with spring-connected lenses or eyeglasses, of two supporting-arms flexibly connected to the outer portion thereof and adapted to fold over onto the eyeglasses, and curved so as to correspond to the outline of the edges thereof and to pass around them when the glasses are folded, substantially as and for the purpose described.

2. The combination, with the eyeglass-frame $a\ b$, of the apertures $c$, between the lens and the spring $b$, and the supporting-arm $d$, hinged to the outer portion of said frame and formed to correspond to the outline of the upper edge of the adjacent lens and to terminate in the aperture $c$, substantially as described and shown.

3. The eyeglass and spectacles combined, consisting of the lens-frames $a$ $a$, united by the spring $b$, and provided respectively with the apertures $c$ at their junction with said spring, the arms $d$ $d$, hinged to the outer portions of the lens-frames and formed to correspond with the outline of the upper edge of their adjacent lens and to terminate at the aperture $c$, and the spring-pad $s$, connected to the free end of the arm $d$, all constructed and combined substantially in the manner described and shown.

In testimony whereof I have hereunto signed my name and affixed my seal, in the presence of two attesting witnesses, at Syracuse, in the county of Onondaga, in the State of New York, this 24th day of February, 1882.

GEORGE BAUSCH. [L. S.]

Witnesses:
 C. H. DUELL,
 LOUIS F. FAHRENWALD.